United States Patent
Zum Mallen et al.

(10) Patent No.: US 6,783,039 B2
(45) Date of Patent: Aug. 31, 2004

(54) BRACKET ASSEMBLY FOR SECURING A COMPACT SPARE TIRE AND A FULL SIZE TIRE

(75) Inventors: Robert G. Zum Mallen, East Liberty, OH (US); Derik Thomas Voigt, Dublin, OH (US); Kerry Stephen McClure, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 44 days.

(21) Appl. No.: 10/222,044

(22) Filed: Aug. 16, 2002

(65) Prior Publication Data

US 2004/0031826 A1 Feb. 19, 2004

(51) Int. Cl.[7] .............................................. B62D 43/10
(52) U.S. Cl. ............................... 224/42.13; 224/42.24; 224/552; 224/553; 296/37.14; 296/37.2; 414/463
(58) Field of Search ........................... 224/42.12, 42.13, 224/42.24, 552, 553; 280/767; 296/37.14, 37.2, 37.3; 414/463, 464, 466

(56) References Cited

U.S. PATENT DOCUMENTS

| | | | | |
|---|---|---|---|---|
| 2,162,046 A | * | 6/1939 | Albinson | 224/42.13 |
| 2,631,886 A | * | 3/1953 | Keller | 296/37.2 |
| 3,482,749 A | * | 12/1969 | Cooper | 224/42.24 |
| 4,410,117 A | * | 10/1983 | Crawford et al. | 224/42.24 |
| 4,423,900 A | * | 1/1984 | Sugimoto et al. | 296/37.14 |
| 4,718,582 A | * | 1/1988 | Iovenitti | 224/42.21 |
| 4,738,382 A | * | 4/1988 | Natori | 224/42.12 |
| 4,948,021 A | * | 8/1990 | Murphy et al. | 224/553 |
| 5,076,477 A | * | 12/1991 | Colgan | 224/42.2 |
| 5,730,338 A | * | 3/1998 | Travis | 224/42.21 |
| 5,799,845 A | * | 9/1998 | Matsushita | 224/42.24 |
| 5,823,408 A | * | 10/1998 | Kim | 224/42.24 |
| 5,921,449 A | * | 7/1999 | Saegusa et al. | 224/42.12 |
| 6,290,278 B1 | * | 9/2001 | Loveland | 296/37.3 |
| 6,389,670 B2 | * | 5/2002 | Morin et al. | 414/466 |
| 2002/0050500 A1 | * | 5/2002 | Vasseur | 224/42.24 |

FOREIGN PATENT DOCUMENTS

JP          58-136575 A   *   8/1983   .............. 224/42.13

* cited by examiner

*Primary Examiner*—Gary E. Elkins
(74) *Attorney, Agent, or Firm*—Porter Wright Morris & Arthur LLP; Christen M. Millard, Esq.

(57) ABSTRACT

An assembly for storing a compact spare tire in a motor vehicle in which a second tire of regular size (larger than the compact spare) is secured at a predetermined space adjacent or within the vehicle on a second plane distal from the plane of the storage location of the compact spare, after the compact spare tire is removed and the regular tire is replaced, for example, in the event of a flat. The assembly includes first and second brackets cooperatively oriented to secure the tires in first and second separated planes.

17 Claims, 16 Drawing Sheets

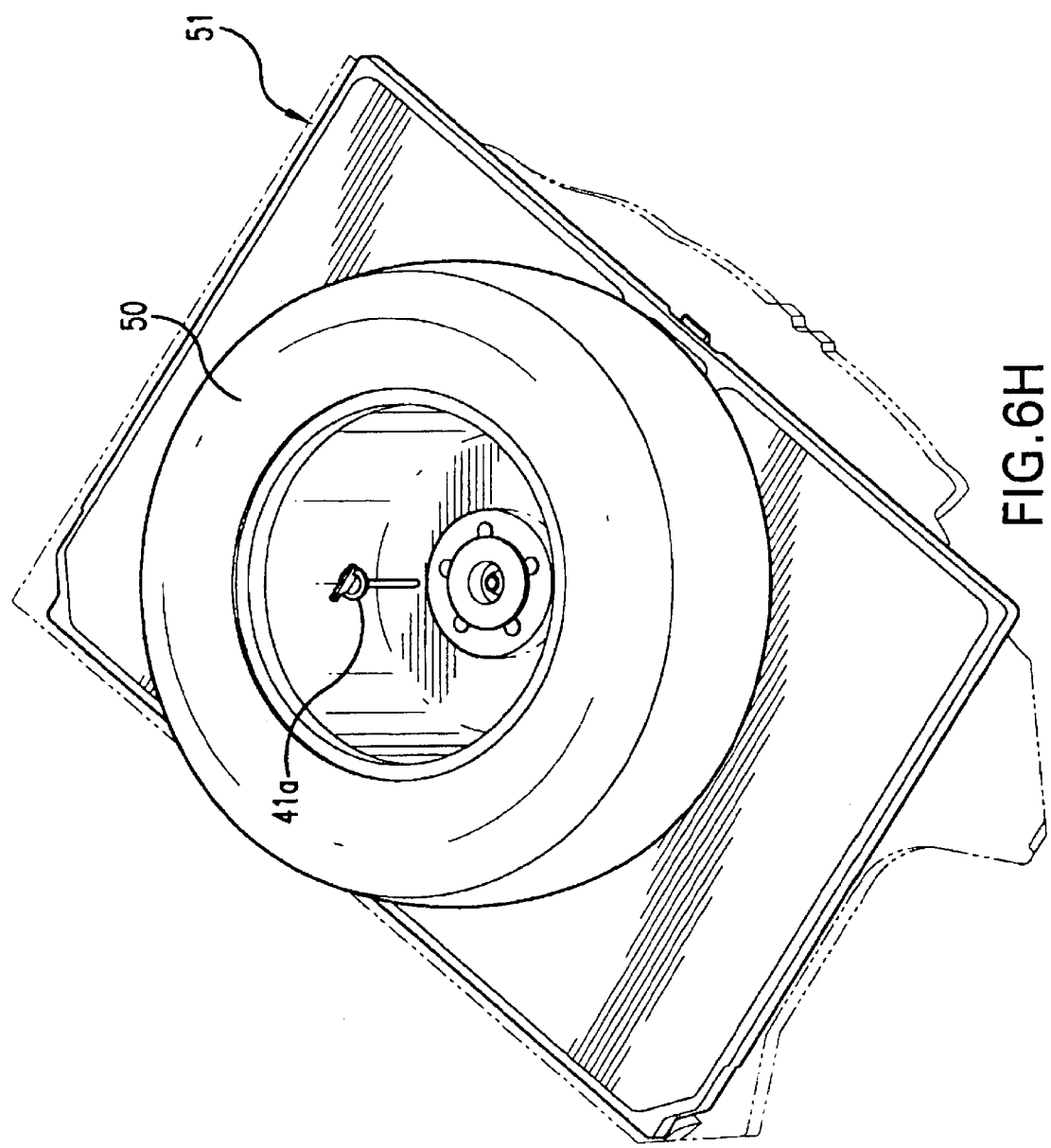

BRACKET ASSEMBLY FOR SECURING A COMPACT SPARE TIRE AND A FULL SIZE TIRE

BACKGROUND OF THE INVENTION

The present invention relates to a bracket assembly, which, when attached to a motor vehicle, secures a compact spare tire and a regular tire, when the regular tire is replaced by the compact tire, at a predetermined location on or within the vehicle. More particularly, the present invention relates to a bracket assembly for securing a compact spare tire in a first spare location (such as a trunk well or other storage volume), and, when the compact spare is removed for use, securing the full sized tire (usually a non functioning flat) that the spare has replaced, adjacent to the space formerly occupied by the spare tire. The invention is useful when the volume of the compartment used for the storage of a compact spare does not accommodate a full sized tire having a volume, width or diameter greater than that of the compact spare.

The present invention provides a first bracket that secures a spare tire in a trunk well, usually below the trunk floor, and a second bracket, extensible from the first, that secures the regular sized flat tire outside of the spare compartment, such as on the trunk floor, after the spare is installed. In this manner, after the spare is removed from its storage compartment, the replaced flat, which would not otherwise fit in the spare compartment, is fixed in position and prevented from shifting and other movement.

The invention provides a primary bracket that secures the compact spare tire in a spare tire storage volume, location, or compartment, and an additional rotatable bracket cooperative with the primary bracket, for securing the replaced tire (namely, a regular full size "flat" tire) in a parallel plane distal to the location in which the compact spare is maintained. The full size replaced tire is fixed in position and restrained in movement while in transit, for example, for repair.

Vehicles are typically provided with a spare tire to replace a tire that has otherwise become flat or unusable. There are alternative designs for spare tires: a full size spare of the same size as the tires with which the vehicle is outfitted, and a compact spare, usually smaller in diameter and width than the regular tires of the vehicle. The use of a compact spare is limited to short distance use, usually to a destination where the regular tire can be repaired. A compact spare is generally not intended as a permanent replacement for the regular tire.

Both full size and compact spares may be stored within a compartment within a vehicle. Compact spares have an advantage over full sized spares in that a compact tire occupies less volume as a result of its smaller size, allowing more space to be allocated for other uses within the vehicle. A compact spare also weighs less than a full size tire, allowing a driver (or other assistant) to manipulate the compact tire when needed with greater ease. A small spare reduces the total weight of the vehicle. The benefits of space reduction, easier manipulation and reduced weight achieved by a compact spare are desirable attributes that appeal to vehicle consumers; a reduction in a vehicle's curb weight may also increase fuel efficiency incrementally.

A problem exists, however, when a compact spare tire is stored in a storage space that is smaller in volume than a storage volume required by a regular tire. In the event that a vehicle operator uses the compact spare, the volume of the compartment in the vehicle where the compact tire is stored will not be large enough to accommodate the unusable regular, full size tire that has been replaced by the compact spare. Many times a driver (or assistant) will put the unusable tire unsecured in the trunk or other area of the vehicle. The movement of an unsecured tire within the passenger area, the trunk, or other area of the vehicle may cause a distraction to the driver, an inconvenience to passengers, or may have other undesirable cosmetic or operational consequences.

Devices that secure spare tires include: U.S. Pat. No. 5,076,477 to Colgan disclosing a mounting bracket including holes that receive a bolt to secure a spare tire; U.S. Pat. No. 2,631,886 to Keller disclosing a bracket with a raised cylindrical portion made to fit inside a central circular opening of a tire in which a bolt extending through a depression in a cover extends into the cylinder to secure the tire below the plane of the vehicle floor; and U.S. Pat. No. 2,162,046 to Albinson disclosing a structure for holding a spare tire incorporating a U-shaped portion pivotally mounted to a bracket that secures the wheel when closed and a screw clamp in contact with the tread of the tire. The foregoing devices are directed to securing a tire having a size common to both the regular tire and the spare. The devices do not address the instance where a full size tire is replaced by a compact spare and there is insufficient space in the spare well to store a full size tire after the compact spare is installed.

Devices that secure differently sized tires include: U.S. Pat. No. 5,730,338 to Travis; U.S. Pat. No. 5,799,845 to Matsushita; U.S. Pat. No. 4,423,900 to Sugimoto; U.S. Pat. No. 4,718,582 to lovenitti; U.S. Pat. No. 4,738,382 to Natori; and pending U.S. application Ser. No. 2,0020,050, 500 by Vasseur. All disclose devices for securing differently sized tires, however, the space used for the compact spare and the regular tire is in the same plane. The storage area located below the floor of the vehicle where the tires are placed must be sized sufficient to receive a full size regular tire. The devices listed above require the removal and replacement of a trunk cover and a bolt or other clamping mechanism each time the spare tire is exchanged for the full sized tire.

There exists a need for a system that allows a compact spare tire to be stored in a compact storage compartment which also allows the full size regular tire the compact tire replaces to be secured in the vehicle.

BRIEF SUMMARY OF THE INVENTION

The present invention provides an efficient mechanism to secure a vehicle's full size tire in a compartment after the unusable, typically flat, regular tire is replaced by a compact spare. The present invention preserves the advantages offered by a compact spare tire and a compact storage compartment by providing a first bracket that secures the compact spare tire and a second complementary, rotatable bracket for securing the full size tire, for example, on the trunk floor. Through use of a secondary bracket, the full sized tire may be secured outside of the storage compartment, such as upon the floor of a trunk or in a similar relationship to another spare tire storage area, of a vehicle to prevent movement of the regular tire.

BRIEF DESCRIPTION OF THE DRAWINGS

FIGS. 6A, 6B, 6C, 6D, 6E, 6F, 6G, 6H, and 6I show the assembly in various stages during a tire change sequence.

DETAILED DESCRIPTION OF THE INVENTION

Figure 1:
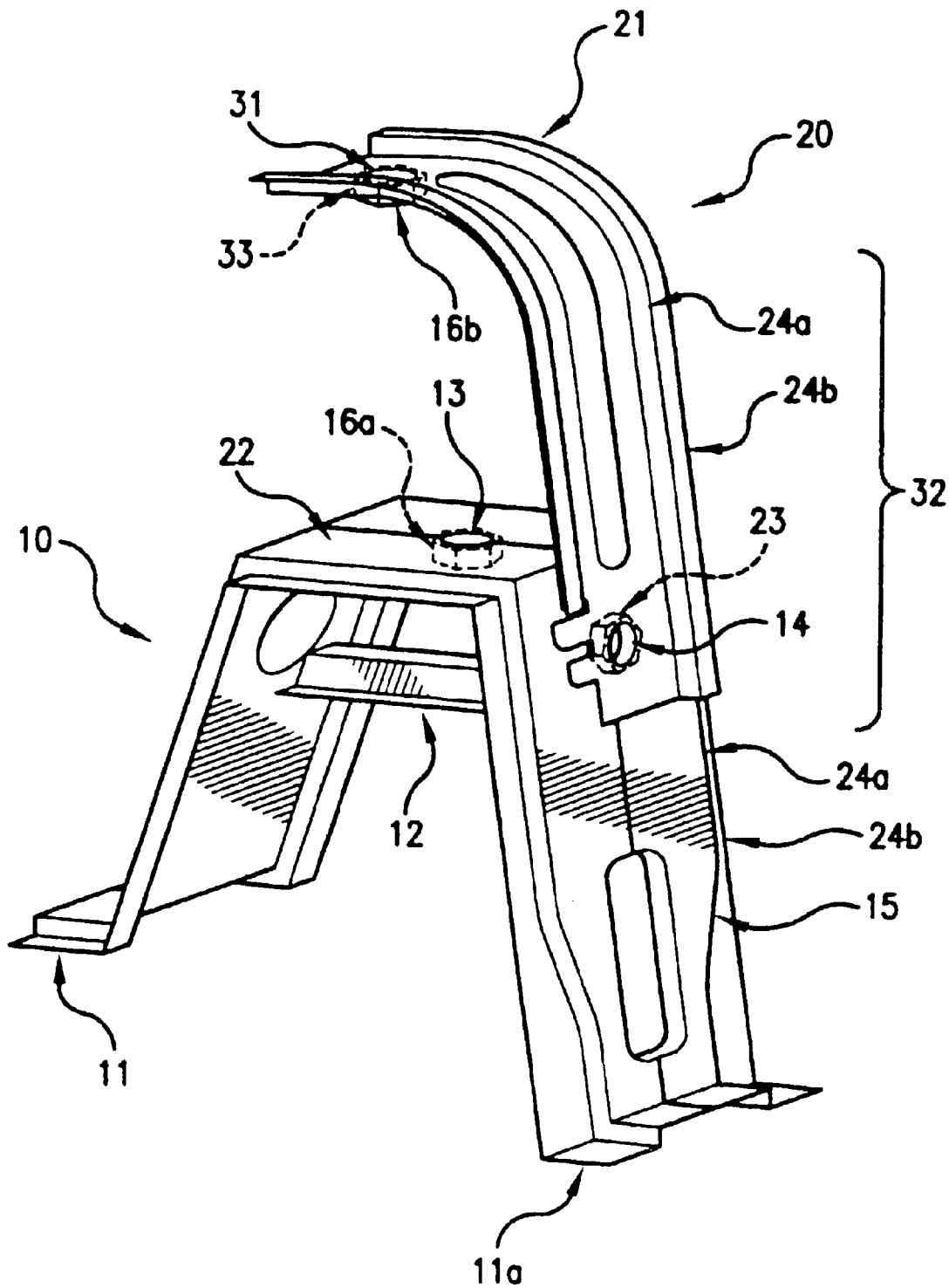
FIG. 1 is a top perspective view of the invention showing the primary bracket in cooperative relationship with the secondary bracket.
Figure 2:
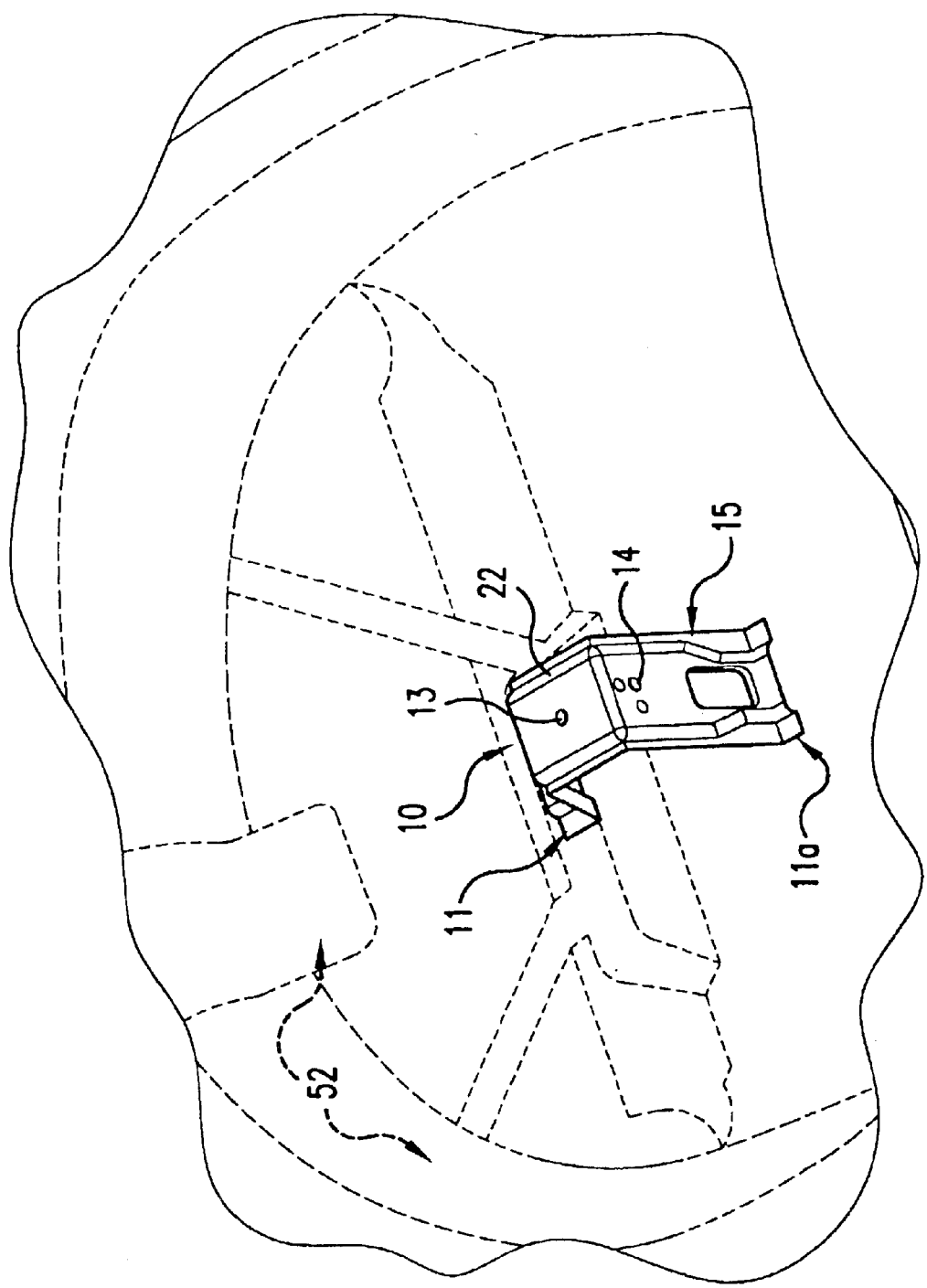
FIG. 2 is a perspective view showing the primary bracket installed in a trunk well sized in volume for the storage of a compact spare.

As shown in FIG. 1, the present invention includes a primary bracket 10 formed from a structural material, such as automotive grade steel, shaped by a known means, such as stamping, into a truncated, inverted "V" or "U" with attachment flanges on either side. The facing sides or legs of the V shape may be separated by any angle desirable as dictated by the other design considerations of the vehicle, but is preferably an angle less than 45 degrees. The primary bracket 10 has a foundation that secures the bracket 10 to a vehicle and supports the secondary bracket 20. The attachment flanges 11, 11a at the ends of the primary bracket 10, are secured to a vehicle, externally or internally, by a conventional fastener, such as welding, riveting, bolts, and the like, thereby securing the primary bracket 10 to the vehicle. The orientation of the primary bracket 10 may be horizontal or vertical. References in the description assume a horizontal orientation in which the spare and regular tire are stored and fixed; however, the intended reference applies equally to a vertical orientation with comparable relationships.

Figure 5A:
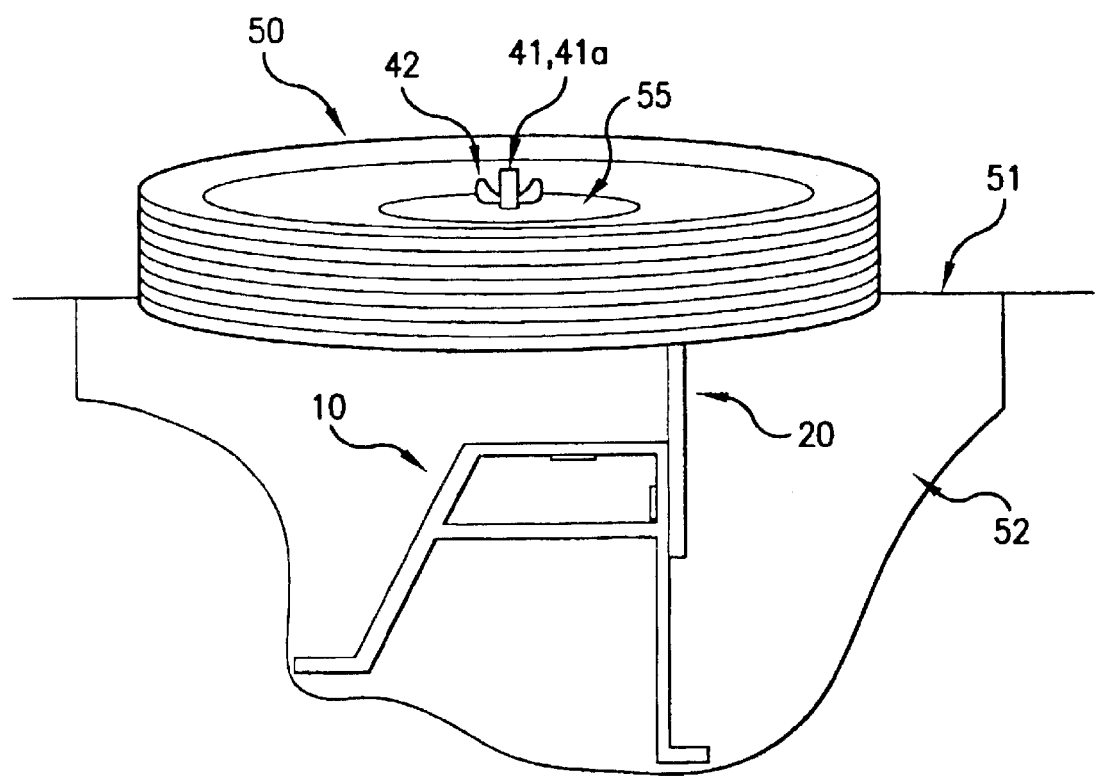
FIG. 5A is a cut away side view of the preferred embodiment of the invention showing the full size tire secured on the trunk floor above the cover of a spare tire well, held in place by the secondary bracket extending from the primary bracket.

In the preferred embodiment, primary bracket 10 is attached to the base of a storage compartment 52 (as shown in FIG. 5A) beneath the floor of a vehicle compartment, for example, the trunk of a sedan. The space in the storage compartment 52 under the primary bracket 10 is sufficient to accommodate a jack (used to lift a side of the vehicle to change a tire) and the various tools (wrench, etc.,) needed to change a tire on a motor vehicle. To prevent rattling of the jack and tools in the storage compartment, the primary bracket may include fasteners, or the jack may be expanded after being properly placed in the compartment, to cause an interference fit between the jack and the bracket 10.

Figure 4:
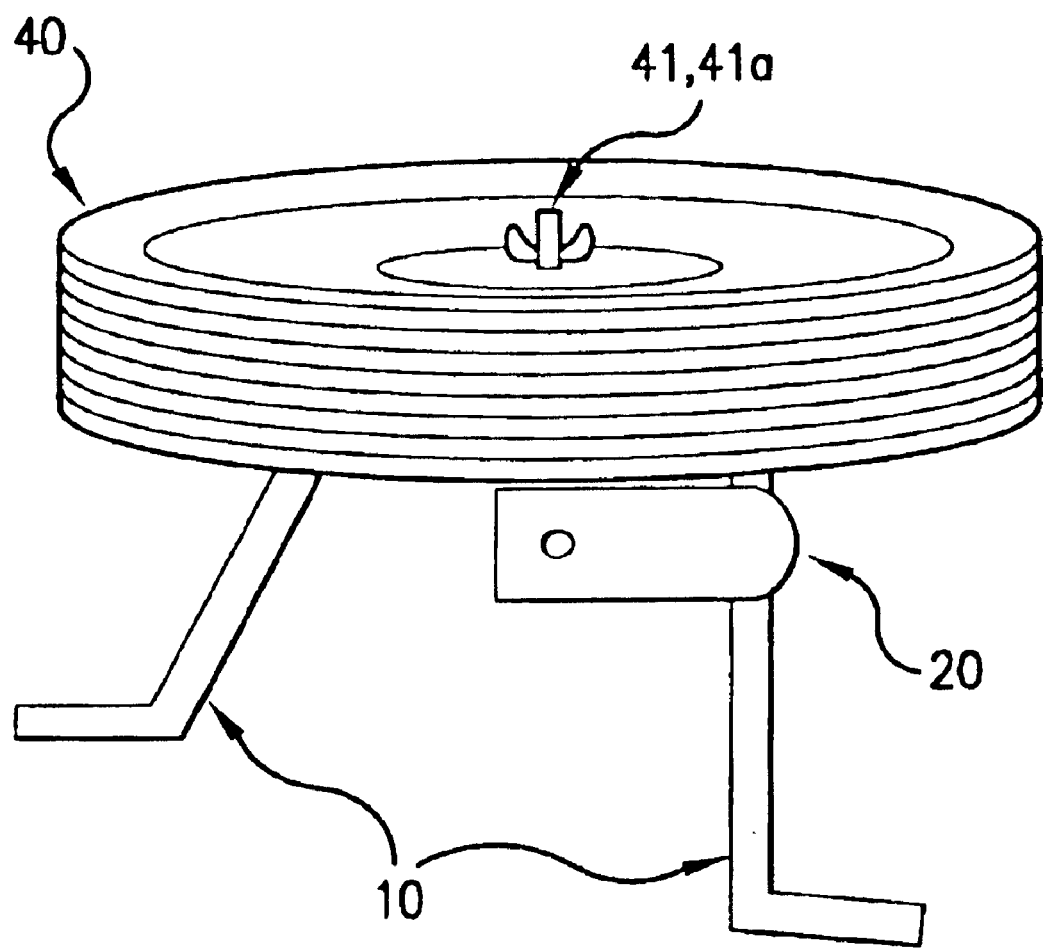
FIG. 4 is a side view of the preferred embodiment bracket holding a compact spare in a recessed trunk well located below the trunk floor.

The compartment 52 has a volume corresponding to at least the space required for storage of a compact spare tire 40 within the compartment 52. As shown in FIG. 4, the primary bracket 10 is capable of securing, and is used to secure a compact spare tire 40 in the compartment 52. When the compact spare tire 40 is secured within the compartment 52, it may be considered as being secured on a first plane.

Referring to FIG. 1, the primary bracket 10 may include strut 12 as a support. The strut 12 extends intermediate the legs of the primary bracket 10. Bracket 10 also includes opening 13 for attaching a compact spare tire 40 (as shown in FIG. 4) and opening 14 for attaching the rotatable secondary bracket 20. A fastener for securing into place, such as a bolt 41 and nut 42, or a wing bolt 41a, may be used to secure the compact spare tire 40 in the spare tire compartment 52.

Figure 3A:
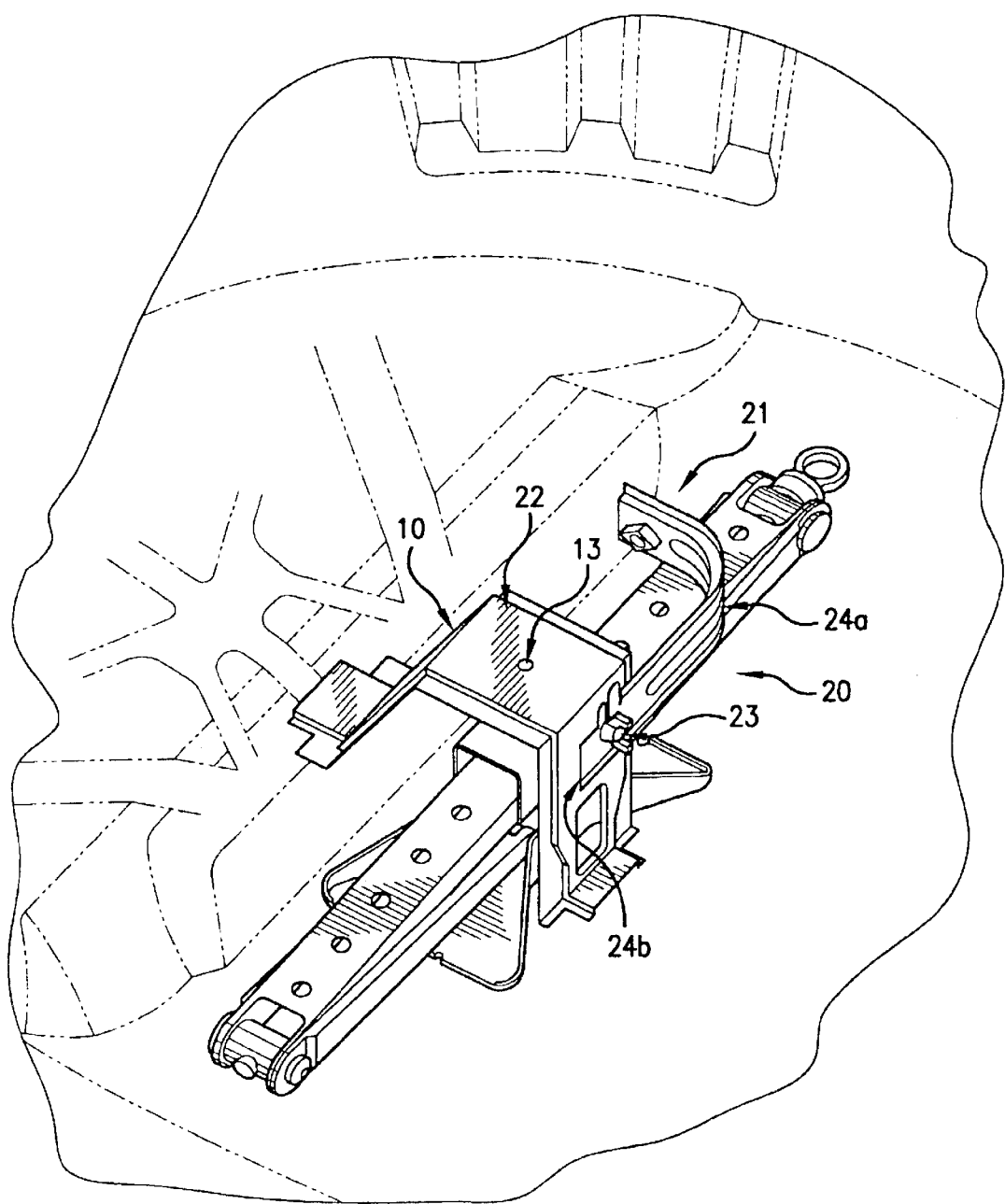
FIG. 3A is a perspective view the secondary bracket in a stored position (when it is not needed).

As shown in FIG. 3A, secondary bracket 20 is pivotally attached to the primary bracket 10. The secondary bracket 20 includes means 23, (shown in the drawings as a wing bolt in the preferred embodiment) to pivot the secondary bracket 20 with reference to the primary bracket 10. The secondary bracket 20 is attached to the primary bracket 10 at the pivot-fixing means 23. In the preferred embodiment, the secondary bracket 20 is a J-shaped bracket having an upper portion 21 and a lower portion 32 in a cooperative shape and relationship with respect to supporting member 15 of the primary bracket 10.

When compact spare tire 40 is stored according to the invention, the secondary bracket 20 is positioned at an angle in relation to support 15 of the primary bracket 10 to which secondary bracket 20 is pivotally attached. The upper portion 21 of the secondary bracket 20 is located below the top surface 22 of primary bracket 10.

Figure 3B:
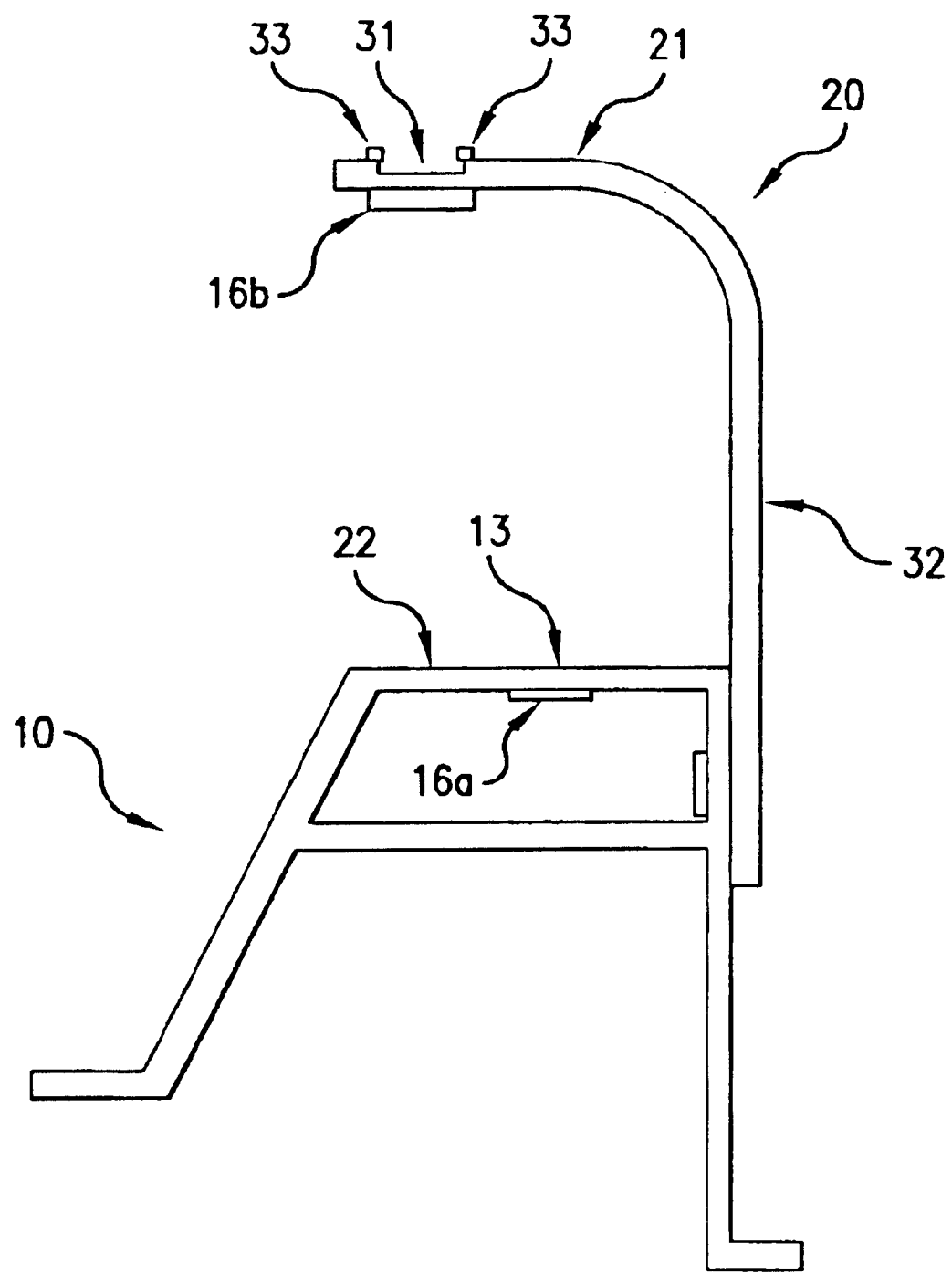
FIG. 3B shows a side view of the secondary bracket in an upward position (when the bracket is needed to secure the large tire on the trunk floor, as in the preferred embodiment).

Referring to FIG. 3B, secondary bracket 20 is pivotally rotated approximately parallel to the support 15 of the primary bracket 10 to accept a tire. When the secondary bracket 20 is in the position shown in FIG. 3B, it is capable of securing a full sized tire 50 at a predetermined location distal from the compartment 52 for the spare tire 40, when the spare tire 40 has been removed from the primary bracket 10. In this position, the upper portion 21 of secondary bracket 20 extends over the top surface 22 of the primary bracket 10 at a distance defined by the length of the lower portion 32. Primary 10 and secondary 20 brackets may include reinforcements to support the secondary bracket 20 in the extended position, such as one or more corresponding grooves 24a and cooperative indentations and protrusions 24b formed in the brackets. These corresponding grooves 24a and indentations 24b may also orient the secondary bracket 20 with respect to the primary bracket 10 when the secondary bracket is in the extended position. If the primary bracket 10 is placed vertically, the secondary bracket 20 may require additional bracing. When the full size tire 50 is secured to the secondary bracket 20, it may be considered as being secured on a second plane distal from the compartment 52.

To secure the compact spare tire 40, the hub of the compact tire is placed over the top surface 22 of the primary bracket 10 while the secondary bracket 20 is in a stored position. FIG. 4 shows a secured compact spare tire 40. Bolt 41 and nut 42, wing bolt 41a, or other type of fastener is passed through the hub of the compact tire 40 and the opening 13 in the top of the primary bracket 10.

In FIG. 3B, the spare tire is removed. The secondary bracket 20 is pivotally rotated such that the upper portion 21 of the secondary bracket 20 is positioned above the top surface 22 of the primary bracket 10. The secondary bracket 20 is secured to the primary bracket 10 by pivot-fixing means 23. To attach and secure a full sized tire 50, a fastener, such as bolt 41 and nut 42 or wing bolt 41a, is passed through opening 31 in the secondary bracket 20 and an opening in the hub 55 of the full size, regular tire 50 (best shown in FIG. 5B).

The invention provides several means of securing a tire to either the primary bracket 10 or the secondary bracket. In one embodiment, tires are secured by a bolt 41 attached to the opening 13 or 31, prior to the placing of the tire over the bolt. The tire is then secured with a fastener, such as a nut 42. In the preferred embodiment, the primary bracket 10 and secondary bracket 20 each include a nut 16a, b welded proximal to the respective openings 13, 31. A wing bolt 41a is inserted through each tire 40, 50 and secured to the nut 16a, b of the opening 13, 31.

Tire 50 may be securely transported inside or outside of a vehicle. Inside examples include: within a storage area inside the passenger compartment of a vehicle; within a separate compartment, such as a trunk; and within a tire well beneath the floor of a vehicle. Outside examples include any plane of the vehicle, including a truck bed side or bottom, and compartments located on the outside of the vehicle, such as covered spare tire holders on a van or SUV.

FIG. 5A shows the preferred embodiment of the present invention securing a full size tire 50. To facilitate attachment of the full sized tire 50, a fastener, such as bolt 41 and nut 42 or wing bolt 41a, passes through the opening 31 in the secondary bracket 20, an opening in the cover, or top, 51 (i.e., of the spare tire compartment 52 that is aligned with the position of the opening 31 of the secondary bracket 20, through a hole in the hub of the tire 51, and may be further fastened, such as by using a spacer 56. The spacer 56 provides contact between the rim of the hole in the hub and the bolt 41, 41a in instances where the hole is sufficiently larger than the bolt.

In use within a compartment 52, the lower portion 32 of the secondary bracket 20 is of sufficient length such that the upper portion 21 of the secondary bracket 20 is in proximal contact with the interior surface of the top 51 of the compartment 52. In such a manner, the secondary bracket 20 supports the top 51 of the compartment 52 against the weight of the full size tire 50 placed on the exterior surface of the top 51 of the compartment 52, and allows for securing the tire 50 outside of the compartment 52. The secondary bracket 20 may also be used to secure the compact tire 40 in a like manner. In such a position, the present invention secures a tire 50 in a predefined location and prevents the arbitrary movement of a tire by force and inertia within a motor vehicle in transit.

Figure 5B:
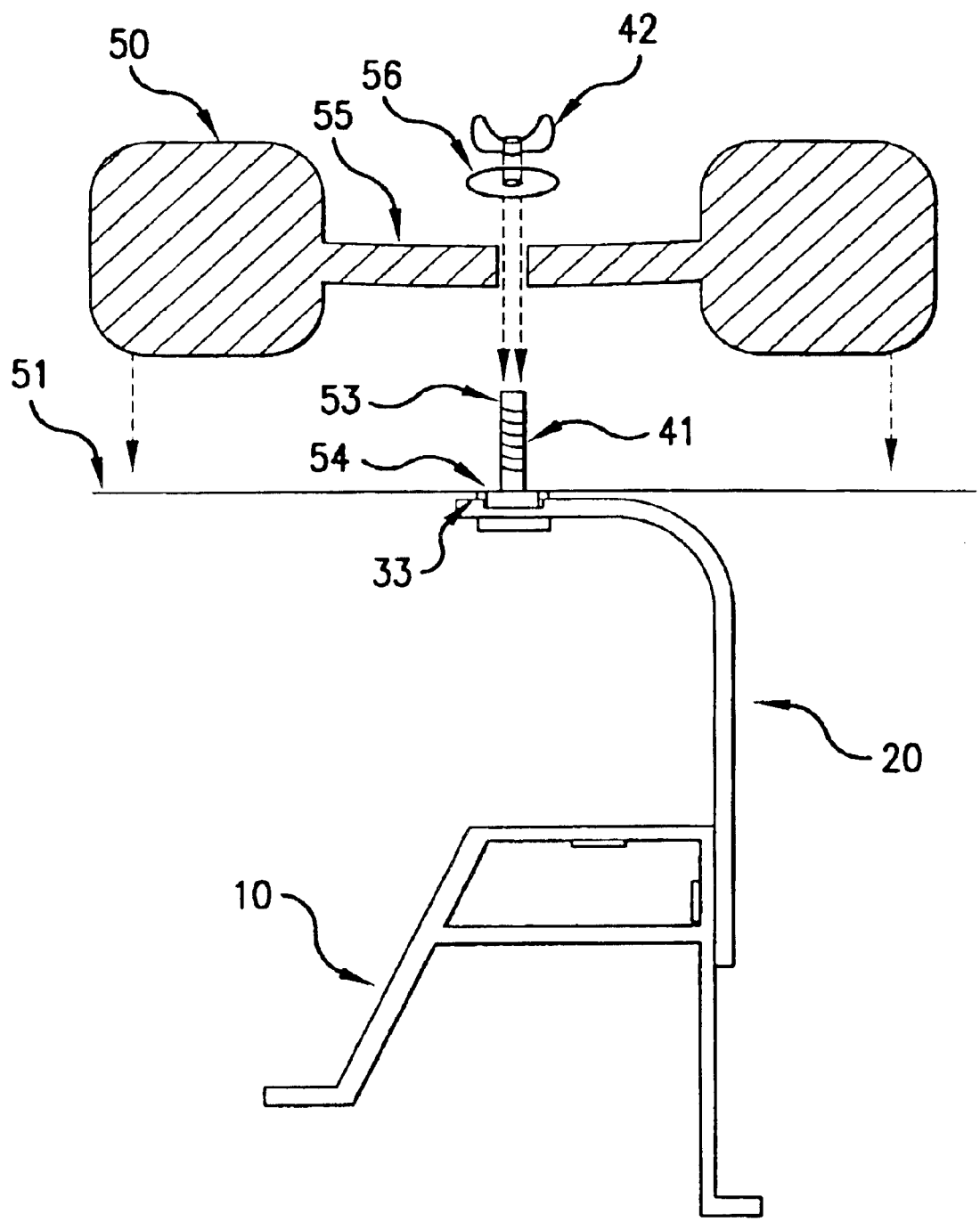
FIG. 5B shows a side view of an embodiment of the invention depicting the primary bracket and the extended secondary bracket, in which the secondary bracket secures a bolt that protrudes through the cover of the spare tire compartment beneath the trunk floor secures a tire.

FIG. 5B shows an embodiment of the present invention depicting a bolt holder 33 that secures the head of the bolt 41 to the secondary bracket 20. The bolt holder 33 allows a user to insert the bolt 41 into the secondary bracket 20 at the opening 31, shut the cover 51 to the compartment 52 with the threaded end 53 of the bolt 41 protruding through the opening 54 of the cover 51, and fix the hub 55 of the tire to the assembly by the bolt 41, using a fixing device such as a wing nut 42, and preferably a spacer 56, at a location predetermined by vehicle design.

Figure 6A:
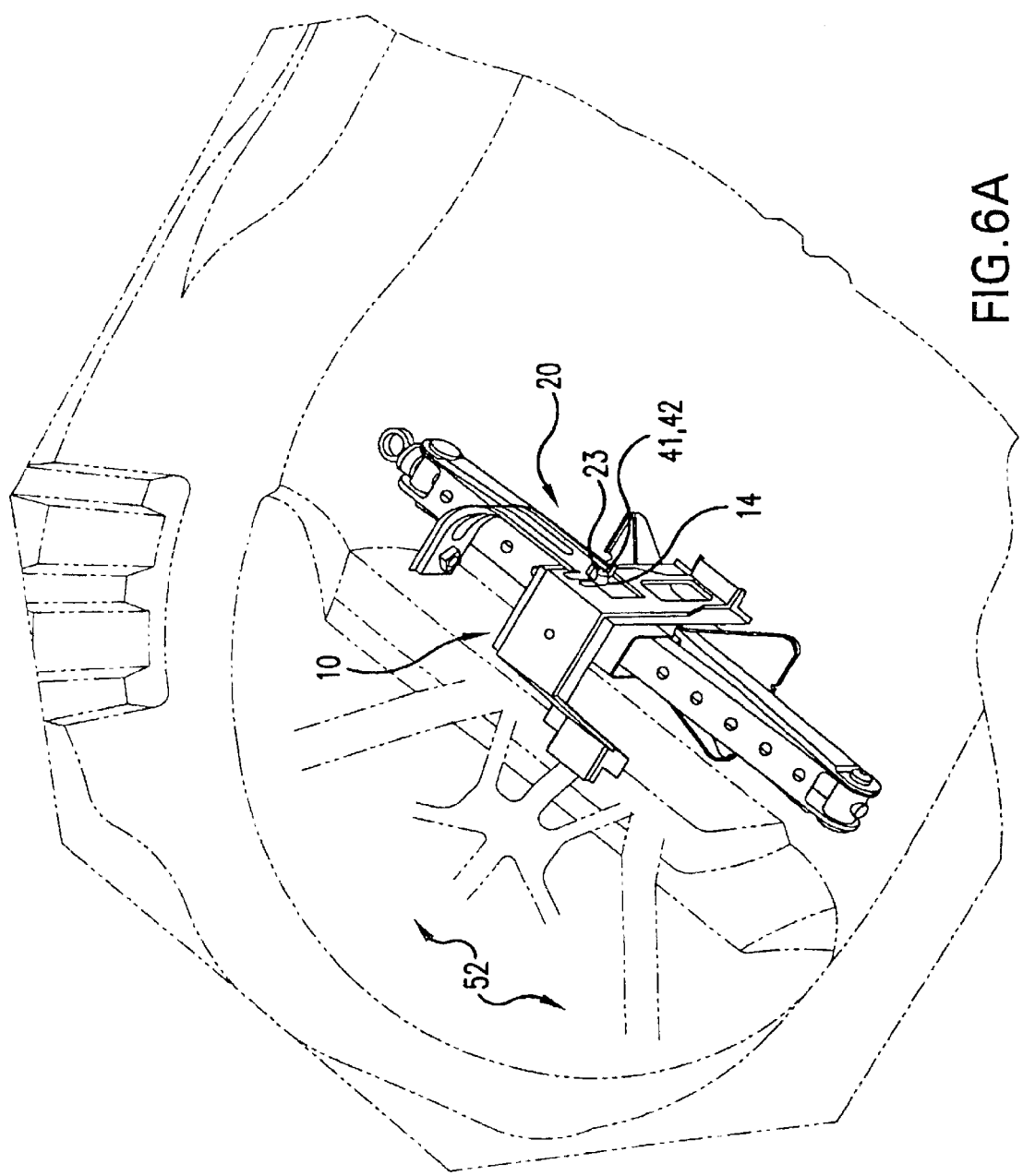
Figure 6B:
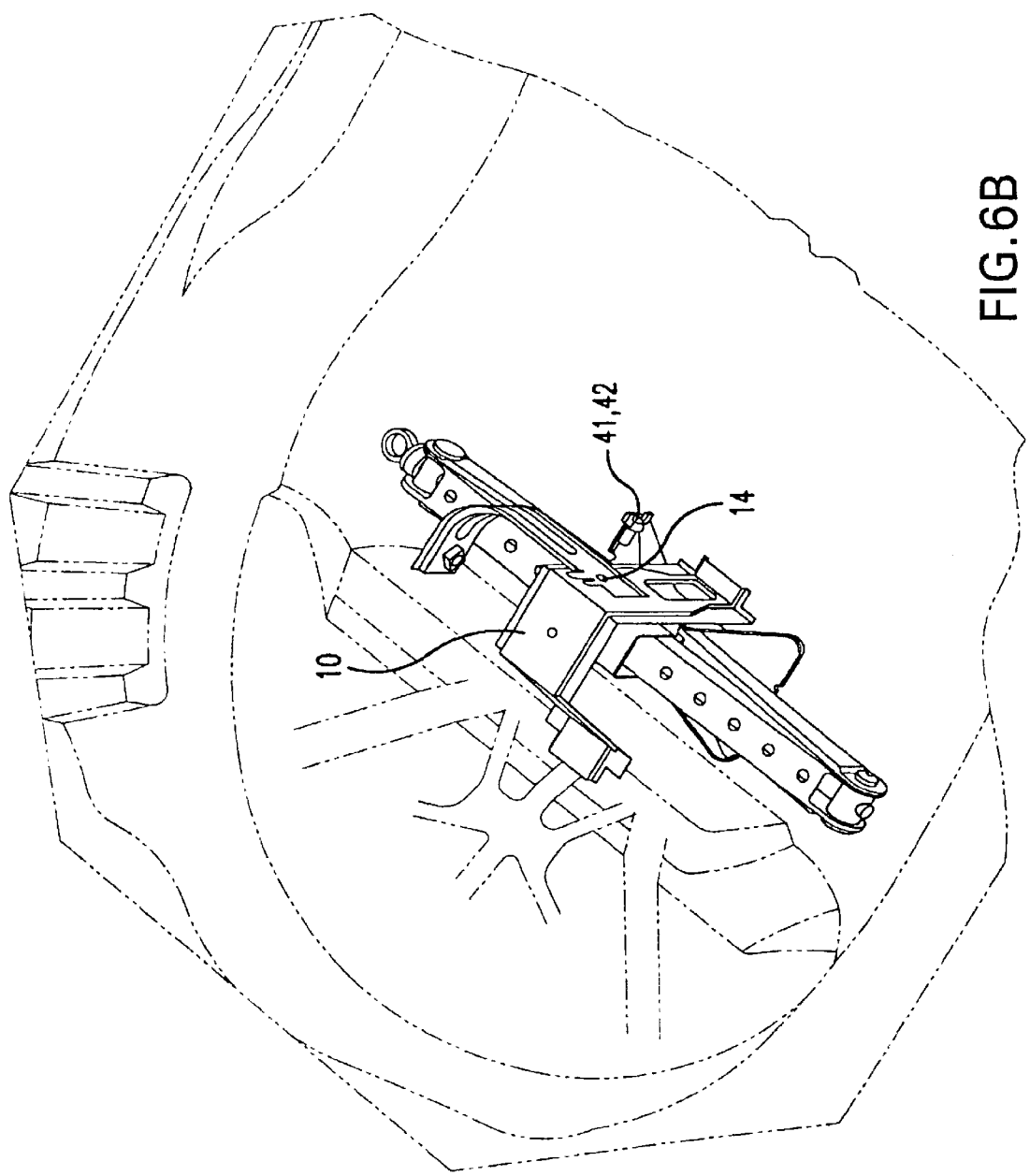
Figure 6C:
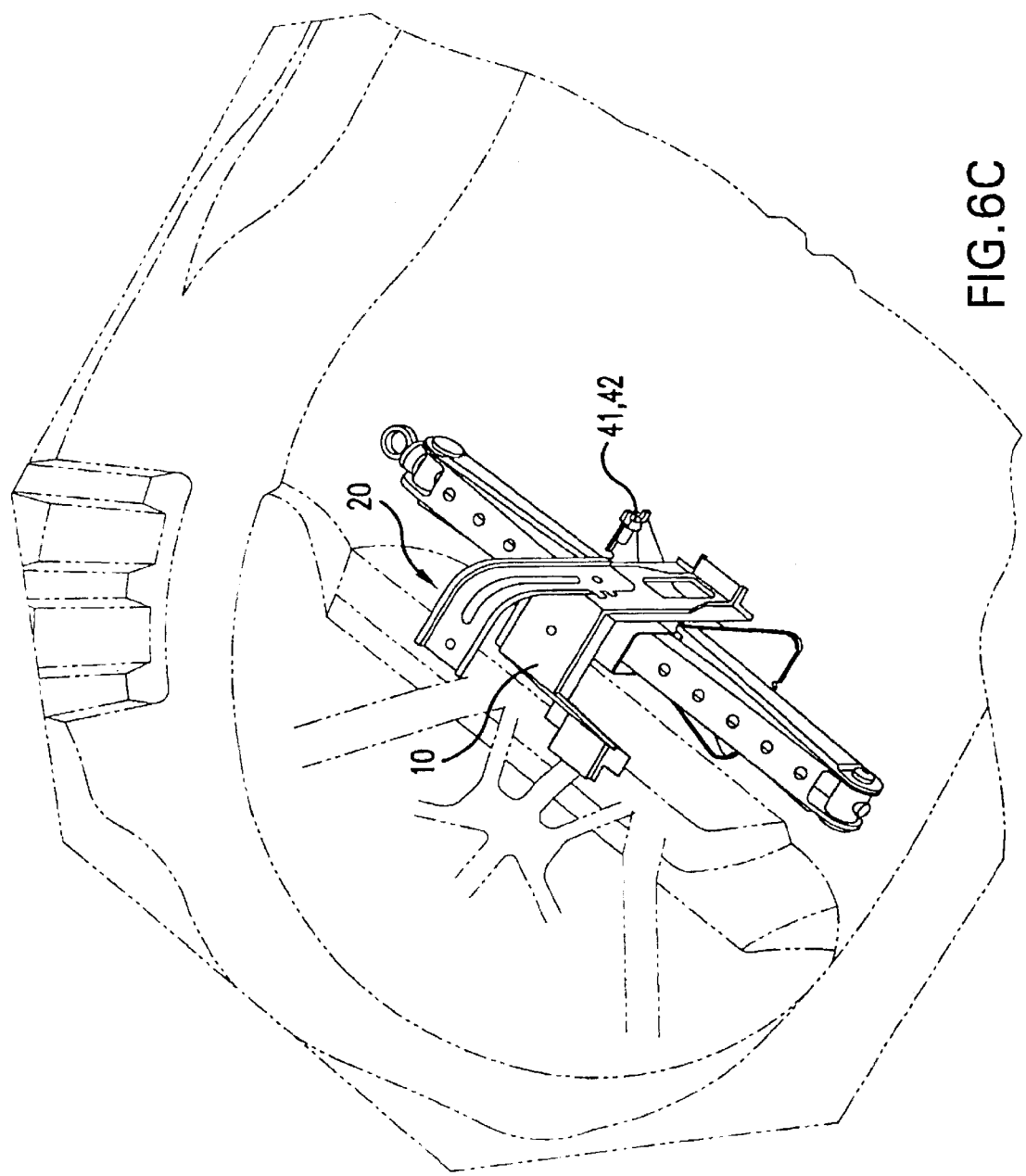
Figure 6D:
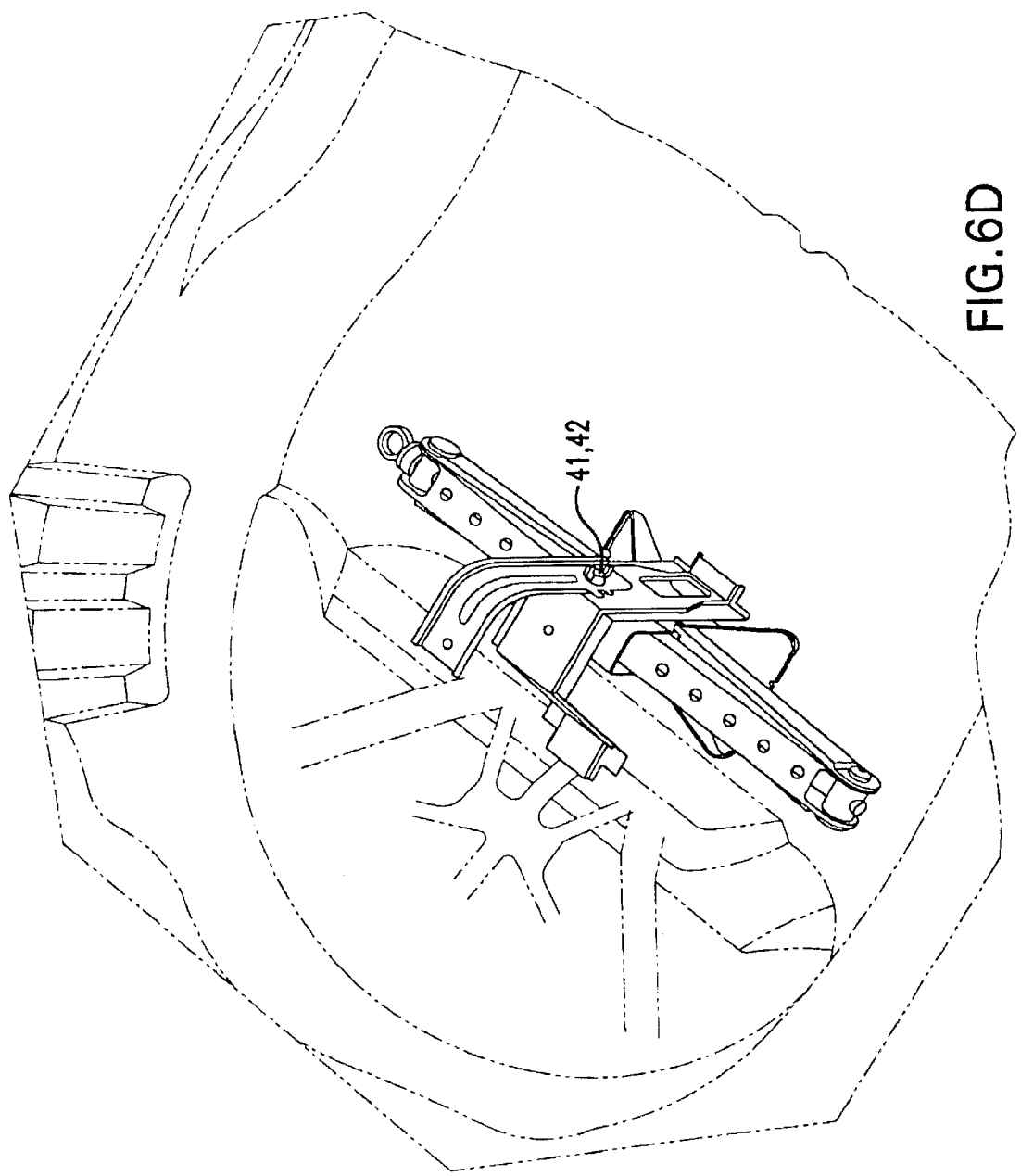
Figure 6E:
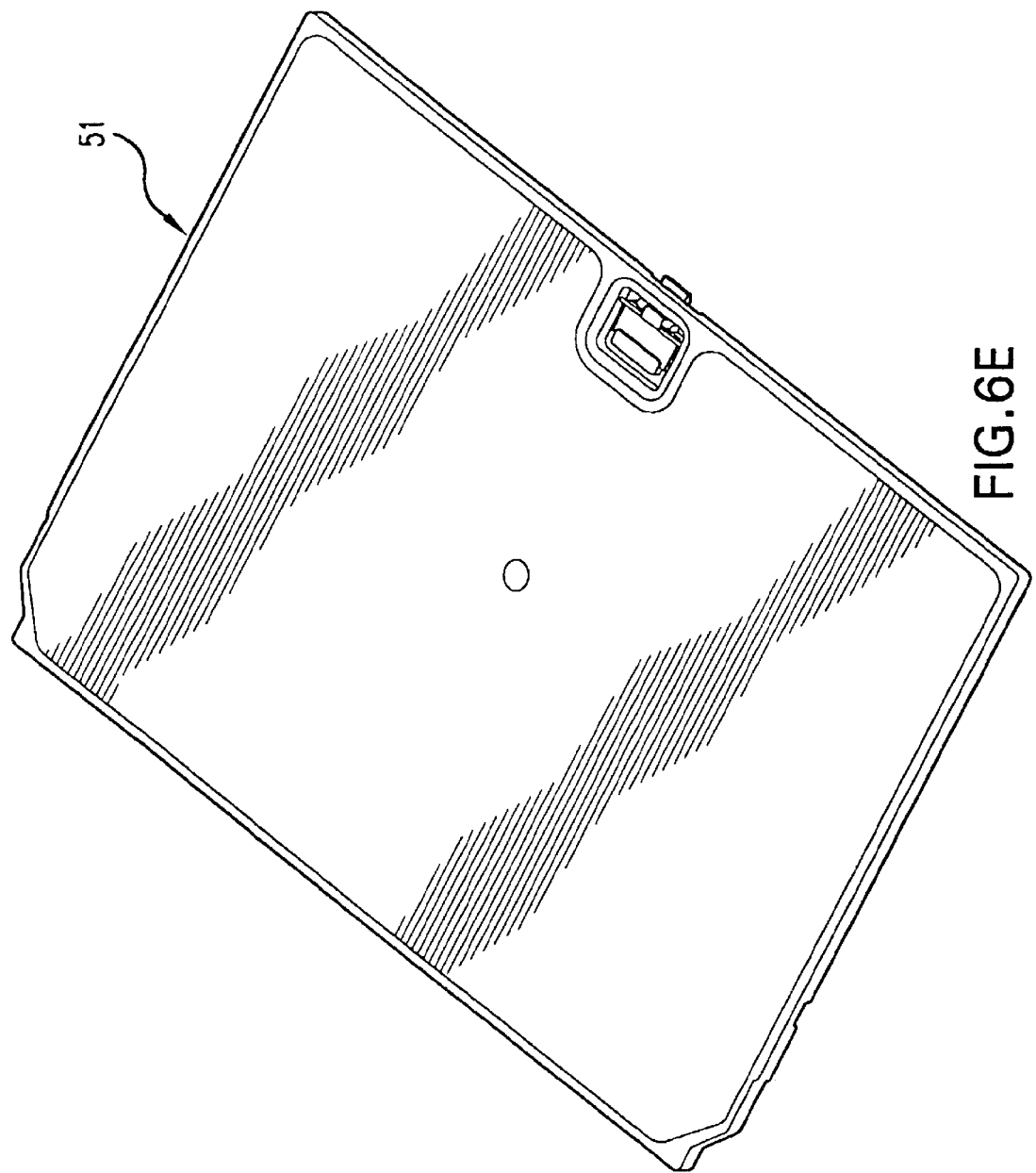
Figure 6F:
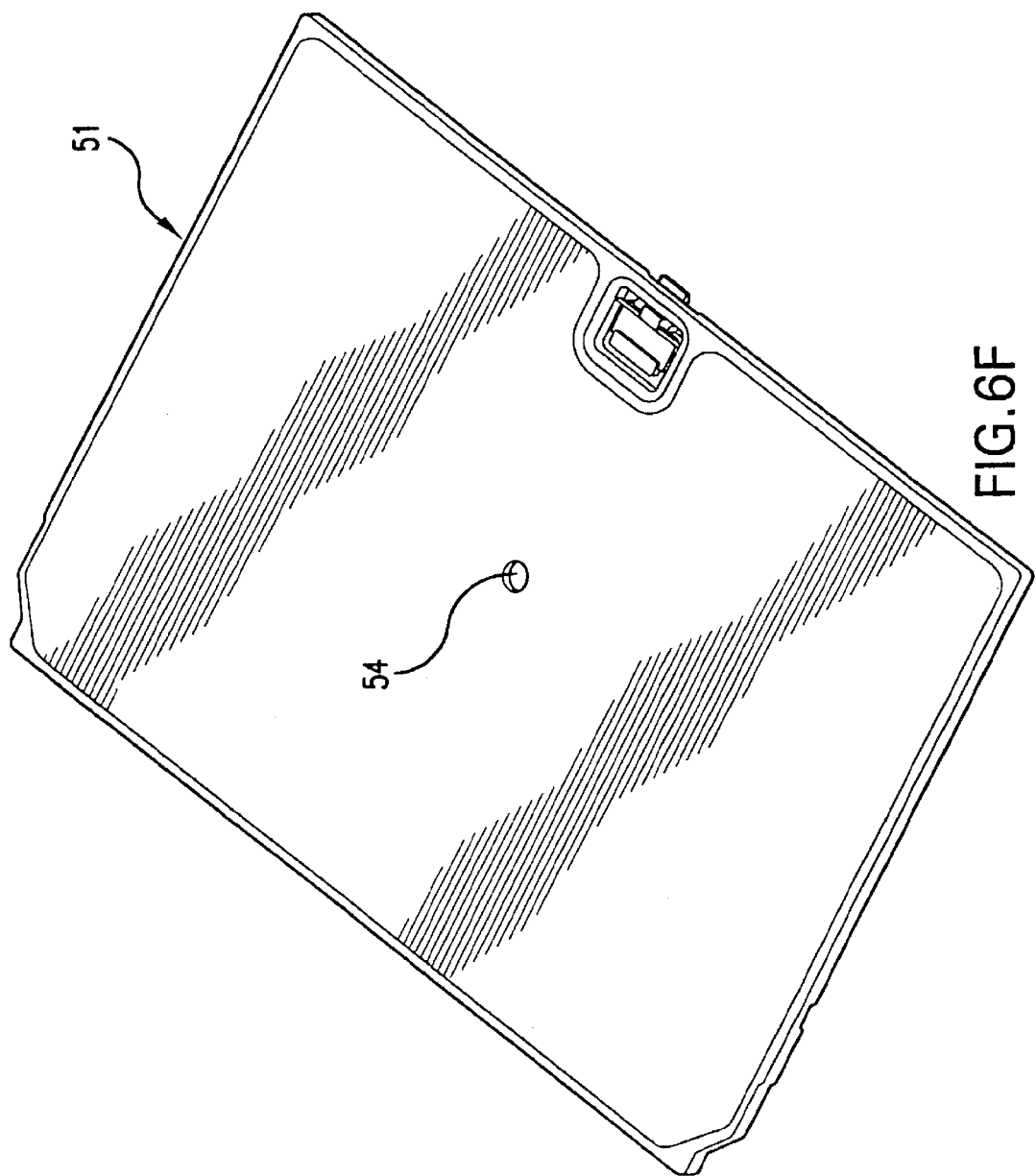
Figure 6G:
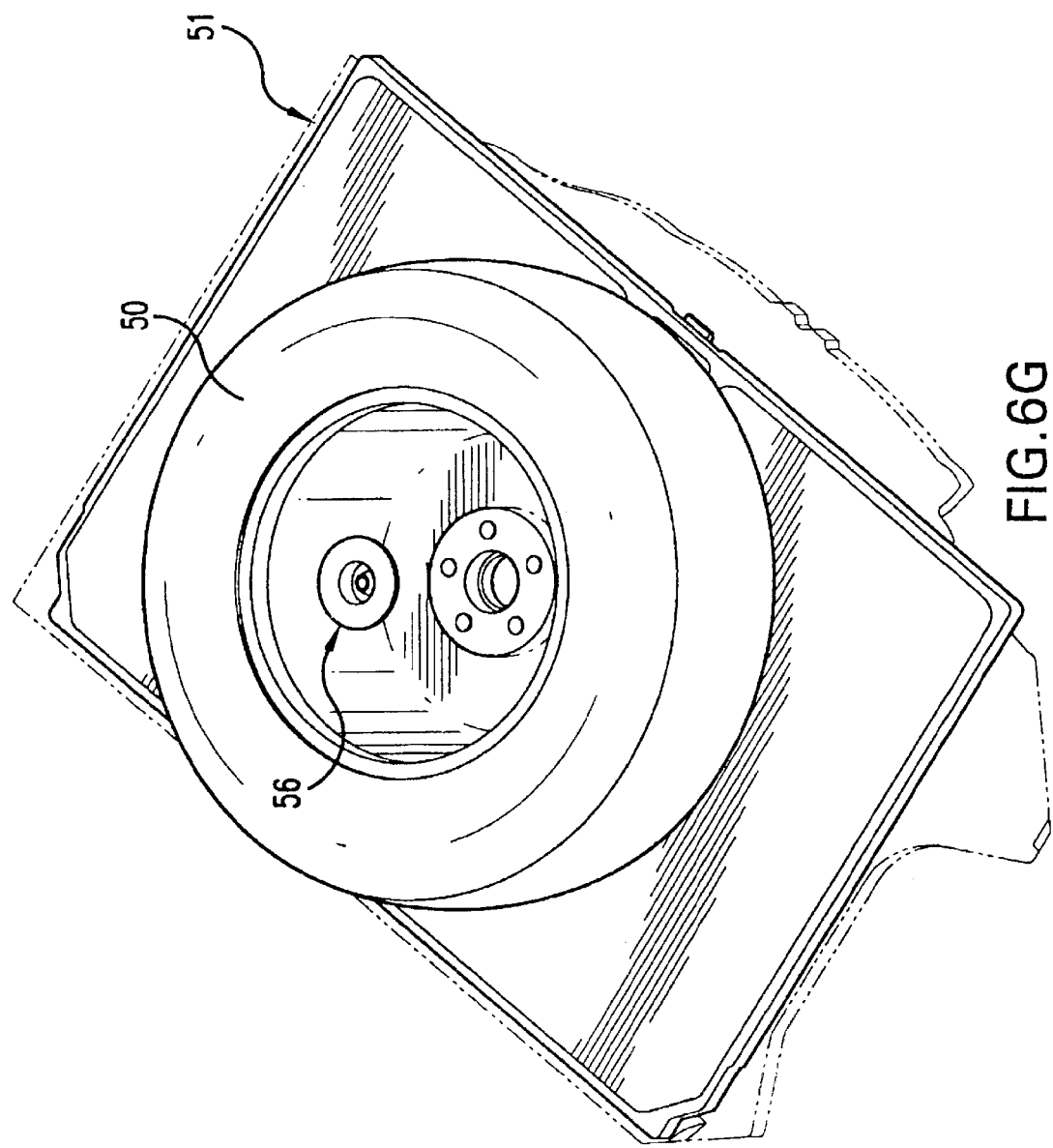
Figure 61:
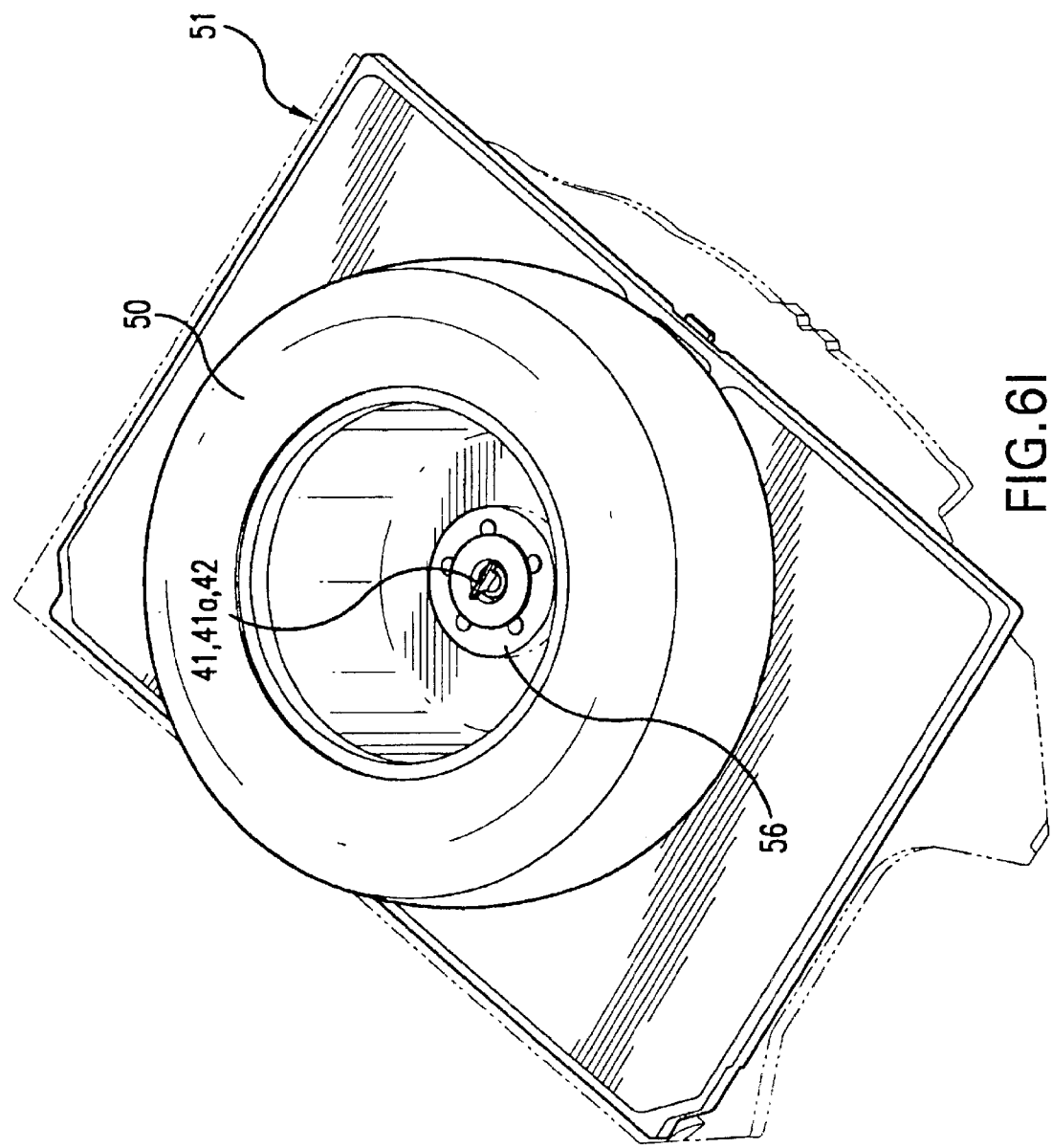

FIGS. 6A, 6B, 6C, 6D, 6E, 6F, 6G, 6H, and 6I show the preferred embodiment of the invention in various stages during a tire change sequence. The sequence begins with the compact spare in a stowed position in a compartment 52 (FIG. 6A), the pivot-fixing means 23 is removed (FIG. 6B), the secondary bracket 20 is rotated approximately 90 degrees (FIG. 6C), the pivot-fixing means 23 is replaced (FIG. 6D), the cargo lid 51 is placed in an ambient mode (FIG. 6E), a plug is removed from the lid 51 (FIG. 6F), the flat tire 50 is placed on the exterior of the cargo lid 51 with a tire securing spacer 56 (FIG. 6G), a wing bolt 41a is installed (FIG. 6H), and the flat tire 50 is secured (FIG. 6I).

In brief, there is described a bracket assembly for storing a compact spare tire in a compartment of a vehicle defined by a first plane and for maintaining in a predetermined location on a second plane, a replaced regular tire. A primary bracket is fastened (preferably by flanges or legs) to a support within the compartment in the vehicle which secures a compact spare tire in the compartment. The compartment has a volume corresponding to the space required for storage of the compact spare and the primary bracket is positioned within the compartment at approximately a central location with respect to the diameter of the compact spare. Pivot means on the primary bracket adjacent an end section opposite the end of the primary bracket secured to the compartment, cooperatively fastens a secondary bracket to the primary bracket. The secondary bracket is capable of being oriented in a first position aligned at an angle to the primary bracket such that the attached secondary bracket is positioned below the top surface of the primary bracket and a second position extending away from a support leg of the primary bracket. The secondary bracket has an upper portion and a lower portion disposed at an angle with respect to each other and oriented in a cooperative relationship with the primary bracket such that, when the secondary bracket is in the second position, the lower portion of the secondary bracket is approximately parallel to a leg of the primary bracket and the upper portion of the secondary bracket is disposed approximately parallel to the top surface of the primary bracket in an adjacent plane. The secondary bracket, when extended from the primary bracket, secures a second tire larger in size than the compact spare at a location, for example, on the removable floor of a car trunk that separates the spare storage well from the trunk space, on a second plane distal from the recessed compartment for the spare tire when the spare is removed from the primary bracket.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described.

What is claimed is:

1. An assembly for storing a compact spare tire within a compartment of a vehicle and for securely maintaining in a predetermined location outside the compartment a replaced regular tire comprising:

a primary bracket secured to a vehicle and capable of securing a compact spare tire in the compartment, the compartment having a volume corresponding to the space required for storage of the compact spare tire, and a secondary bracket pivotally attached to the primary bracket and capable of securing a tire at a predetermined location distal from the compartment when the spare is removed from the primary bracket.

2. The assembly of claim 1 wherein the primary bracket includes attachment flanges for securing the primary bracket to the vehicle.

3. The assembly of claim 2 wherein the primary bracket is formed in the shape of an inverted truncated "V" and the attachment flanges for securing the bracket to the compartment structure extend outward from ends of the "V."

4. The assembly of claim 3 wherein the primary bracket includes a strut extending intermediate to legs forming the "V."

5. The assembly of claim 4 wherein the primary bracket is formed by stamping.

6. The assembly of claim 1 wherein the primary bracket further includes reinforcements.

7. The assembly of claim 4 wherein the angle between facing sides of the "V" shape of the primary bracket is less than 45 degrees.

8. The assembly of claim 1 including one or more than one groove on at least one of the primary bracket and the secondary bracket for orienting the primary bracket and the secondary bracket with respect to each other.

9. The assembly of claim 1 in which a lower portion of the secondary bracket is of sufficient length such that an upper portion of the secondary bracket, when the secondary bracket is positioned in the second position, contacts an interior surface of a covering of the compartment and supports the covering when the tire is positioned on an exterior surface of the covering.

10. The assembly of claim 1 wherein the securing of the compact tire by the primary bracket and the securing of the tire by the secondary bracket is a bolt and a nut.

11. The assembly of claim 10 in which the secondary bracket includes means to hold the bolt, said means securing a head portion of the bolt to an opening in the second segment of the secondary bracket such that a threaded portion of the bolt extends approximately parallel to and distal to the first segment of the secondary bracket.

12. The assembly of claim 11 in which the opening of the second segment of the secondary bracket corresponds to a hole in the covering of the compartment such that the threaded end of the bolt protrudes from the hole and extends to the outside of the compartment.

13. The assembly of claim 12 including a spacer having a diameter greater than a diameter of a hub opening of the tire, said spacer including an aperture capable of accepting the threaded end of the bolt such that when the spacer is placed on the tire positioned on the threaded end of the bolt protruding through the covering of the compartment and a nut is applied to the threaded end of the bolt, the tire is secured in a position outside of the compartment.

14. The assembly of claim 1 wherein the securing of the compact tire by the primary bracket and the securing of the tire by the secondary bracket includes nuts fixed to the primary and secondary brackets, each nut positioned to accept a bolt.

15. The assembly of claim 14 including a spacer having a diameter greater than a diameter of a hub opening of the tire, said spacer including an aperture capable of accepting the threaded end of the wing bolt such that when the spacer is placed on the tire and the wing bolt is inserted through the spacer and accepted by the nut, the tire is secured in a position outside of the compartment.

16. A bracket assembly for storing a compact spare tire within a compartment of a vehicle defined by a first plane and for securely maintaining in a predetermined location on a second plane a replaced regular tire comprising:

a primary bracket fastened to the vehicle and capable of securing a compact spare tire in the compartment, the compartment having a volume corresponding to at least the space required for storage of the compact spare tire, said primary bracket including one or more than one groove;

a secondary bracket pivotally attached to the primary bracket, said secondary bracket capable of being oriented in a first position and a second position to secure a tire at a predetermined location on the second plane distal from the compartment when the spare is removed from the primary bracket, said secondary bracket including one or more than one reinforcement corresponding to one or more than one corresponding reinforcement in the primary bracket for orienting the primary bracket and the secondary bracket with respect to each other, and including a lower portion of sufficient length such that an upper portion of the secondary bracket, when the secondary bracket is positioned in the second position, contacts an interior surface of a covering of the compartment and supports the covering when the tire is positioned on an exterior surface of the covering, said upper portion of the secondary bracket including an opening and a welded nut corresponding to a hole in the covering of the compartment; and a spacer having a diameter greater than a diameter of a hub opening of the tire, said spacer including an aperture capable of accepting a wing bolt such that when the spacer is placed on the tire and the wing bolt is inserted through the spacer, the tire, the opening of the secondary bracket and accepted by the nut, the tire is secured in a position outside of the compartment.

17. The assembly of claim 16 wherein the reinforcement is a groove and the corresponding reinforcement is a protrusion.

* * * * *